United States Patent [19]

Upton

[11] 3,801,336

[45] Apr. 2, 1974

[54] LEAD BOROSILICATE OPTICAL GLASS ADAPTABLE TO FUSION WITH PHOTOCHROMIC GLASS TO PRODUCE MULTIFOCAL LENS

[75] Inventor: Lee O. Upton, Sturbridge, Mass.

[73] Assignee: American Optical Corporation, Southbridge, Mass.

[22] Filed: Feb. 20, 1973

[21] Appl. No.: 333,835

[52] U.S. Cl.............. 106/53, 106/54, 106/47 Q
[51] Int. Cl......... C03c 3/08, C03c 3/10, C03c 3/30
[58] Field of Search.............. 106/47 Q, 47 R, 53

[56] References Cited
UNITED STATES PATENTS

| | | | |
|---|---|---|---|
| 3,653,933 | 4/1972 | Tsunekawa | 106/47 Q |
| 3,535,133 | 10/1970 | Akhtan | 106/53 |
| 3,529,980 | 9/1970 | Bromer | 106/47 Q |
| 3,480,453 | 11/1969 | Reid et al | 106/47 R |

Primary Examiner—A. B. Curtis
Assistant Examiner—Mark Bell
Attorney, Agent, or Firm—Howard J. Berkenstock, Jr.; William C. Nealon

[57] ABSTRACT

A high index of refraction, low softening point, low expansion segment glass is fused into a countersunk photochromic glass blank of lower index of refraction. The high index of refraction segment is primarily composed of $SiO_2$, $B_2O_3$ and $PbO$ with lesser amounts of other oxides.

10 Claims, 6 Drawing Figures

PATENTED APR 2 1974  3,801,336

LEAD BOROSILICATE OPTICAL GLASS ADAPTABLE TO FUSION WITH PHOTOCHROMIC GLASS TO PRODUCE MULTIFOCAL LENS

BACKGROUND OF THE INVENTION

1. Field of the Invention

Fused glass multifocal lenses with particular reference to multifocal lenses having major portions formed of photochromic glass and glass segment portions of lower refractive index fused thereto.

2. Description of the Prior Art:

Multifocal lenses having segment portions of high refractive index glass fused to major portions of relatively low refractive index glass are common in the art as evidenced by U.S. Pat. Nos. 2,755,706 and 2,958,162. Glasses used for the segment and major portions of such lenses, i.e. having compatible coefficients of expansion and softening temperatures, are readily available in colors or clear. Since, however, these segment glasses do not provide a compatible expansion fit and do not have softening temperatures low enough to prevent impairment of the photo-response of known photochromic glass major portions after fusion, the manufacture of photosensitive multifocal lenses has been restricted either to those of one-piece construction of the type shown in U.S. Pat. Nos. 2,410,145 and 2,890,551, for example, or of the cemented type wherein the segments are cemented into countersinks of major portions of the lenses or the alternative of a photochromic overlay.

Cemented glass multifocal lenses are currently becoming obsolete in view of their not being able to withstand air-toughening temperatures or ion-exchange processing now used and/or contemplated for future use in the finishing of lenses for customer wearing purposes.

In the light of occupational safety and health regulations now requiring all glass lenses to be toughened either by air hardening or ion exchange process before wearing, glass photosensitive multifocal lenses capable of withstanding the required toughening processes have, heretofore, become extremely difficult if not impossible to produce. The cemented type tends to delaminate and/or otherwise become interfacially defective while, on the other hand, impairment of the required or desired photoresponse characteristics of photochromic lens major portions and interfacial defects result from attempts to fuse segment portions of conventional high refractive index glasses to the photochromic major portions.

A principle objective of the present invention is to provide a novel high refractive index multifocal lens segment glass having a coefficient of expansion which is compatible with currently available photochromic relatively low refractive index lens major portion glass, the high index segment glass having a softening temperature which is low enough to prevent impairment of photoresponse of the photochromic major portion glass during the operation of thermally sealing (i.e. fusing) the segment glass to the photochromic major portion glass.

Another object of the invention is to provide a family of high refractive index glasses suitable for thermal sealing to currently available low refractive index photochromic glasses without impairment of the photoresponse of the latter glasses and to provide improved multifocal lenses incorporating these high and low refractive index glasses.

The invention will be more readily understood from the following detailed description taken in conjunction with the accompanying drawings.

IN THE DRAWINGS

DESCRIPTION OF THE PREFERRED EMBODIMENTS

Figure 1:
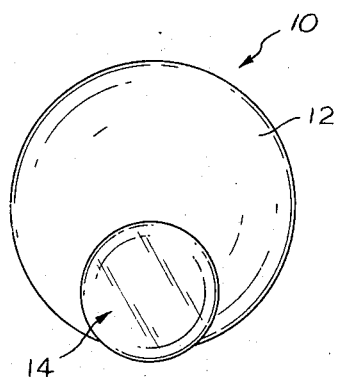
FIG. 1 is a front elevational view of a fused multifocal lens of a type which is pertinent to this invention.

Examples of photochromic glasses known and used for ophthalmic lenses are given in U.S. Pat. Nos. 3,208,860 and 3,449,103.

The disclosure of the first-mentioned patent concerns inorganic silicate glasses containing submicroscopic crystals of a silver salt, e.g. silver chloride, silver bromide, silver iodide, all of which become darker in color when the glass is subjected to actinic radiation. The glasses regain their original color when the radiation is removed.

The latter U.S. Pat. No. 3,449,103 discloses still another photochromic or phototropic glass useful for lenses or the like.

While various types of photochromic glass may be used for the present invention, a photochromic glass having the following analysis may be considered as typical of the type suitable for use in conjuction with improved segment glasses of the present invention:

TABLE I

| Oxide | Weight percent |
|---|---|
| $SiO_2$ | 57.3 |
| Mixed $Al_2O_3$ $Fe_2O_3$ | 10.8 |
| BaO | 8.17 |
| $Na_2O$ | 6.23 |
| $B_2O_3$ | 17.54 |
| Traces of AgH | |

In producing fusion with little or no distorted interface between a low refractive index major portion and a high refractive index segment, the low refractive index glass should have a higher viscosity at the fusion temperature than the segment. Preferably, the low refractive index photochromic major portion would have a refractive index of from 1.50 to 1.55 and the refractive index of the segment glass would be within the range of from 1.59 to 1.70. At fusing temperature, the viscosity of the high refractive segment glass should be lower by about three orders of magnitude than the viscosity of the low refractive index major portion glass. It has been found that, under these conditions, fusion stress of the fused glasses is usually less than 30 kg/cm².

The high refractive index segment glass is formed generally of silicon dioxide, boron oxide and lead oxide, with minor amounts of other oxides. Ranges of ingredients useful for forming this high refractive index segment glass, according to the invention, are given in the following table:

TABLE II

| | |
|---|---|
| $SiO_2$ | 11.00 – 32.00 |
| $B_2O_3$ | 17.90 – 45.50 |
| $Al_2O_3$ | 0 – 9.60 |
| ZnO | 0 – 4.80 |
| BaO | 0 – 2.20 |
| $As_2O_3$ | 0 – 0.30 |
| PbO | 0 – 31.50 |
| $Sb_2O_3$ | 0 – 1.7 |
| $K_2O$ | 0 – 2.00 |
| $Na_2O$ | 0 – 1.00 |

The high refractive index segment glass is prepared by mixing its ingredients for about five minutes, heating the mixture to melting temperature, fining the resulting glass of the melt and then casting the fined glass into the form of a flat sheet or a multiplicity of lens segments. After annealing and cooling, the cast segments or segments cut from a cast sheet of the resulting glass may then be ground and polished to the size and shape desired.

A preferred composition for the high refractive index segment glass is as follows:

EXAMPLE I

| | Weight Percent |
|---|---|
| $SiO_2$ | 20.50 |
| $B_2O_3$ | 21.90 |
| $Al_2O_3$ | 9.60 |
| ZnO | 4.80 |
| BaO | 2.20 |
| $As_2O_3$ | 0.30 |
| PbO | 31.50 |
| $Sb_2O_3$ | 1.7 |
| $TiO_2$ | 2.75 |
| $La_2O_3$ | 4.75 |

A batch of glass formed of the foregoing composition in the proportions of ingredients given in the following Example IA will have an index of refraction of approximately $N_{486}= 1.6706$, $N_{589}= 1.6584$, $N_{656}= 1.6537$, where 486, 589 and 656 are wavelengths of light in millimicrons. Its strain point will be approximately 893°F, anneal point approximately 944, and fiber softening point 1151°F.

EXAMPLE IA

| Composition | Grams |
|---|---|
| $SiO_2$ (Potter's Flint) | 922.50 |
| $B_2O_3$ (Fused) | 985.50 |
| $Al(OH)_3$ | 660.60 |
| ZnO | 216.00 |
| $BaCO_3$ | 127.35 |
| $As_2O_3$ | 13.50 |
| PbO | 1417.50 |
| $Sb_2O_3$ | 76.50 |
| $TiO_2$ | 123.75 |
| $La_2O_3$ | 213.75 |
| Total | 4756.95 grams |

The glass of this composition (Example IA) was formed by mixing all of its ingredients together and melting the mixture in a platinum crucible. The crucible was placed in a furnace wherein its temperature was raised over a period of about four hours from room temperature to a temperature between 2600° and 2650°F to melt the ingredients. The melt was maintained, for the purpose of fining, at a temperature of about 2600°F for a period of about 16 hours. A temperature within the range of from 2300° to 2650°F, held for a period of from one to 16 hours, will produce similar results.

Following the fining cycle, the furnace temperature was gradually lowered to approximately 2000°F and the melt was stirred for approximately four hours at 2000°F.

After stirring, the glass was cast at approximately the same 2000°F temperature onto an iron plate, annealed and cooled and then cut, ground and polished into a multiplicity of pieces each of the configuration desired for use as a segment or as a portion of a segment adaptable to fusion to a photochromic major piece of glass for the making of a fused multifocal lens.

Referring more particularly to the drawings, there is illustrated in FIG. 1 a fused multifocal lens 10 having a major portion 12 formed of a photochromic glass, e.g. of the composition set forth hereinabove under Table I and a segment 14 of a relatively high refractive index glass, e.g. of the composition set forth in Example IA.

In the making of multifocal lens 10, segment 14 (FIG. 2), after having been cast or cut from the aforementioned high refractive index glass, is customarily ground and optically polished on a side 16 to a spherical curvature corresponding to the curvature of a countersink 18 which is also ground and polished into the major piece 12 of lens 10. Surface 16 of segment 14 may be formed to a curvature of slightly shorter radius than that of countersink 18 for purposes of initially making point contact with countersink 18 and thereby expressing air and gases radially outwardly of countersink 18 as segment 14 is caused to gradually assume the countersink shape when heated for fusion thereto, e.g. at a temperature of approximately 1150°F and held at the fusing temperature for a period of time of approximately from seven to ten minutes. Following the fusion of segment 14 to countersink 18 of major piece 12, grinding and polishing of the resultant assembly shown in FIG. 3 along lines 20 and 21, for example, will complete opposite sides of the fused multifocal lens 10. Those interested in greater details of this technique for forming a fused multifocal lens may refer to U.S. Pat. No. 2,958,162.

Figure 2:
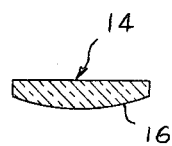
FIG. 2 is a view in cross-section, of a segment component useful in the manufacture of lenses of the type illustrated in FIG. 1.
Figure 3:
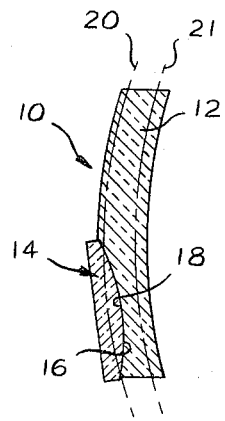
FIG. 3 is a cross-sectional view of an assembly of major and segment portions of glass from which a multifocal lens of the type illustrated in FIG. 1 may be formed.
Figure 4:
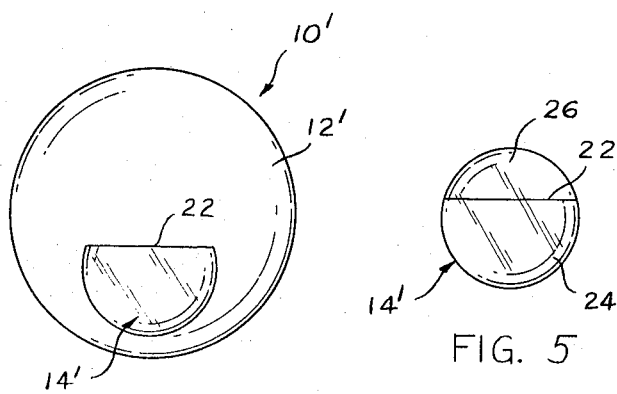
FIG. 4 is a front elevational view of another type of fused multifocal lens.

While FIGS. 1–3 illustrate the making of a multifocal lens having a segment 14 of circular configuration, it should be understood that the present invention is equally applicable to the making of multifocal lenses having segments of different shapes, e.g. of the type shown in FIG. 4. This lens 10' (FIG. 4) is of the type having a segment 14' with a flat or straight upper edge 22. Such a multifocal lens 10' is commonly referred to in the art as a "cutoff" style fused multifocal. Its upper edge 22 may be arcuate with a slightly upwardly directed curvature which blends smoothly into the curvature of the lower portion of the segment or acutely joins the depending curvature of the segment.

Figure 5:
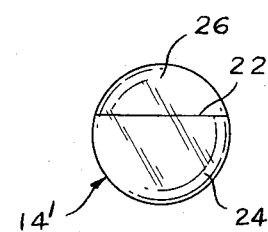
FIG. 5 is a frontal view of a segment component useful in the manufacture of lenses of the type illustrated in FIG. 4.
Figure 6:
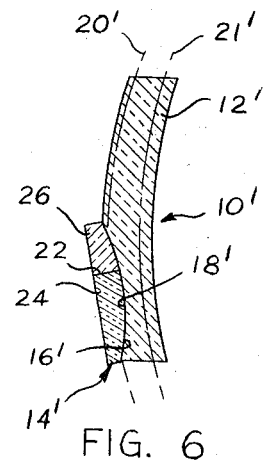
FIG. 6 is a view, in cross-section, of an assembly of major and segment portions of glass from which a multifocal lens of the type illustrated in FIG. 4 may be formed.

In the manufacture of the "cutoff" fused multifocal, its segment 14' (FIG. 5) is formed of two pieces 24 and 26 each cut, ground and polished to the general configuration shown in FIGS. 5 and 6. Piece 24 has the aforementioned straight upper edge 22. Piece 26 is formed of a photochromic glass, preferably identical to the glass used for major piece 12' and is edge fused, e.g. at a temperature of approximately 1150°F, to piece 24 of segment 14'. The two pieces 24 and 26 are then provided with a ground and polished face 16' and, as a unit, fused into countersink 18' of major piece 12.

Multifocal lens 10' is formed by grinding and polishing the fused assembly of segment 14' and major piece 12' to a finished shape and size, e.g. along lines 20' and 21'. Those interested in greater details of the forming of "cutoff" style fused multifocal lenses may refer to U.S. Pat. No. 1,899,777, for example. In the manufacture of the two piece fused segment 14' of FIG. 5 a preferred composition for the glass of portion 24 is that listed under column 9 of Table III which follows.

Following the procedure outlined above relative to Example I, a series of high refractive index glasses may be manufactured which have compatible expansion coefficients with conventional, commercially available, relatively low refractive index photochromic glasses.

TABLE III

| Oxide | 2 | 3 | 4 | 5 | 6 | 7 | 8 | 9 |
|---|---|---|---|---|---|---|---|---|
| $SiO_2$ | 20.00 | 24.00 | 28.00 | 32.00 | 26.00 | 24.00 | 21.00 | 20.00 |
| $B_2O_3$ | 29.90 | 25.90 | 21.90 | 17.90 | 21.90 | 21.90 | 21.90 | 21.90 |
| $Al_2O_3$ | 9.60 | 9.60 | 9.60 | 9.60 | 9.60 | 9.60 | 9.60 | 9.60 |
| ZnO | 4.80 | 4.80 | 4.80 | 4.80 | 4.80 | 4.80 | 4.80 | 4.80 |
| BaO | 2.20 | 2.20 | 2.20 | 2.20 | 2.20 | 2.20 | 2.20 | 2.20 |
| $As_2O_3$ | 0.30 | 0.30 | 0.30 | 0.30 | 0.30 | 0.30 | 0.30 | 0.30 |
| PbO | 31.50 | 31.50 | 31.50 | 31.50 | 31.50 | 31.50 | 31.50 | 31.50 |
| $Sb_2O_3$ | 1.70 | 1.70 | 1.70 | 1.70 | 1.70 | 1.70 | 1.70 | 1.70 |
| $TiO_2$ | — | — | — | — | 2.00 | 2.00 | 3.00 | 3.00 |
| $La_2O_3$ | — | — | — | — | — | 2.00 | 4.00 | 5.00 |
| $N_D$ | 1.6153 | 1.6172 | 1.6136 | 1.6109 | 1.6311 | 1.6430 | 1.6572 | 1.6642 |
| S.T.°F. | 1099 | 1138 | 1161 | 1198 | 1149 | 1160 | 1158 | 1166 |
| $\times 10^7$ | 52 | 51 | 47 | 45 | 49 | 54 | 51 | 55 |

The series of nine high refractive index glasses illustrated in Table III each have a softening temperature low enough to prevent impairment of the photoresponse characteristics of photochromic glasses used in the fused assembly of the segment and major piece in each case of a multifocal lens manufacturing procedure.

I claim:

1. A glass of high refractive index adaptable to fusion with a photochromic glass of lower refractive index consisting essentially of the following ingredients in the range of weight percent:

| | |
|---|---|
| $SiO_2$ | 20.0 – 32.0 |
| $B_2O_3$ | 17.9 – 29.9 |
| $Al_2O_3$ | 9.6 |
| ZnO | 4.8 |
| BaO | 2.2 |
| $As_2O_3$ | 0.3 |
| PbO | 31.5 |
| $Sb_2O_3$ | 1.7 |
| $TiO_2$ | 0 – 3.0 |
| $La_2O_3$ | 0 – 5.0 | said glass having an index of refraction within the range of from 1.6109 to 1.6642.

2. A glass of high index of refraction according to claim 1 wherein the following ingredients are present by weight percent:

| | |
|---|---|
| $SiO_2$ | 20.50 |
| $B_2O_3$ | 21.90 |
| $Al_2O_3$ | 9.60 |
| ZnO | 4.80 |
| BaO | 2.2 |
| $As_2O_3$ | 0.3 |
| PbO | 31.5 |
| $Sb_2O_3$ | 1.7 |
| $K_2O$ | 0 |
| $Na_2O$ | 0 |
| $TiO_2$ | 2.75 |
| $La_2O_3$ | 4.75 |

3. A glass of high refractive index according to claim 1 wherein the ingredients are present in the following specific amounts by weight percent:

| | |
|---|---|
| $SiO_2$ | 20.00 |
| $B_2O_3$ | 29.90 |
| $TiO_2$ | 0 |
| $La_2O_3$ | 0 |
| $Al_2O_3$ | 9.60 |
| ZnO | 4.80 |
| BaO | 2.20 |
| $As_2O_3$ | 0.30 |
| PbO | 31.50 |
| $Sb_2O_3$ | 1.70 |

4. A glass of high refractive index according to claim 1 wherein the ingredients are present in the following specific amounts by weight percent:

| | |
|---|---|
| $SiO_2$ | 24.00 |
| $B_2O_3$ | 25.90 |
| $TiO_2$ | 0 |
| $La_2O_3$ | 0 |
| $Al_2O_3$ | 9.60 |
| ZnO | 4.80 |
| BaO | 2.20 |
| $As_2O_3$ | 0.30 |
| PbO | 31.50 |
| $Sb_2O_3$ | 1.70 |

5. A glass of high refractive index according to claim 1 wherein the ingredients are present in the following specific amounts by weight percent:

| | |
|---|---|
| $SiO_2$ | 28.00 |
| $B_2O_3$ | 21.90 |
| $TiO_2$ | 0 |
| $La_2O_3$ | 0 |
| $Al_2O_3$ | 9.60 |
| ZnO | 4.80 |
| BaO | 2.20 |
| $As_2O_3$ | 0.30 |
| PbO | 31.50 |
| $Sb_2O$ | 1.70 |

6. A glass of high refractive index according to claim 1 wherein the ingredients are present in the following specific amounts by weight percent:

| | |
|---|---|
| $SiO_2$ | 32.00 |
| $B_2O_3$ | 17.90 |
| $TiO_2$ | 0 |
| $La_2O_3$ | 0 |
| $Al_2O_3$ | 9.60 |
| ZnO | 4.80 |
| BaO | 2.20 |
| $As_2O_3$ | 0.30 |
| PbO | 31.50 |
| $Sb_2O_3$ | 1.70 |

7. A glass of high refractive index according to claim 1 wherein the ingredients are present in the following specific amounts by weight percent:

| | |
|---|---|
| $SiO_2$ | 26.00 |
| $B_2O_3$ | 21.90 |
| $TiO_2$ | 2.00 |
| $La_2O_3$ | 0 |
| $Al_2O_3$ | 9.60 |
| ZnO | 4.80 |
| BaO | 2.20 |
| $As_2O_3$ | 0.30 |
| PbO | 31.50 |
| $Sb_2O_3$ | 1.70 |

8. A glass of high refractive index according to claim 1 wherein the ingredients are present in the following specific amounts by weight percent:

| | |
|---|---|
| $SiO_2$ | 24.00 |
| $B_2O_3$ | 21.9 |
| $TiO_2$ | 2.00 |
| $La_2O_3$ | 2.00 |
| $Al_2O_3$ | 9.60 |
| ZnO | 4.80 |
| BaO | 2.20 |
| $As_2O_3$ | 0.30 |
| PbO | 31.50 |
| $Sb_2O_3$ | 1.70 |

9. A glass of high refractive index according to claim 1 wherein the ingredients are present in the following specific amounts by weight percent:

| | |
|---|---|
| $SiO_2$ | 21.00 |
| $B_2O_3$ | 21.9 |
| $TiO_2$ | 3.00 |
| $La_2O_3$ | 4.00 |
| $Al_2O_3$ | 9.60 |
| ZnO | 4.80 |
| BaO | 2.20 |
| $As_2O_3$ | 0.30 |
| PbO | 31.50 |
| $Sb_2O_3$ | 1.70 |

10. A glass of high refractive index according to claim 1 wherein the ingredients are present in the following specific amounts by weight percent:

| | |
|---|---|
| $SiO_2$ | 20.00 |
| $B_2O_3$ | 21.90 |
| $TiO_2$ | 3.00 |
| $La_2O_3$ | 5.00 |
| $Al_2O_3$ | 9.60 |
| ZnO | 4.80 |
| BaO | 2.20 |
| $As_2O_3$ | 0.30 |
| PbO | 31.50 |
| $Sb_2O_3$ | 1.70 |

* * * * *